United States Patent [19]
Hara

[11] Patent Number: 5,261,733
[45] Date of Patent: Nov. 16, 1993

[54] SHOE OF CRAWLER BELT OR CHAIN
[75] Inventor: Yoshiaki Hara, Hadano, Japan
[73] Assignee: The Yokohama Rubber Co., Ltd., Tokyo, Japan
[21] Appl. No.: 889,392
[22] Filed: May 28, 1992
[30] Foreign Application Priority Data May 29, 1991 [JP] Japan ............................ 3-39397[U]
May 29, 1991 [JP] Japan ............................ 3-39398[U]
May 29, 1991 [JP] Japan ............................ 3-39400[U]

[51] Int. Cl.⁵ .............................................. B62D 55/26
[52] U.S. Cl. ............................................ 305/46; 305/51
[58] Field of Search ................. 305/35 R, 38, 39, 46, 305/51, 54

[56] References Cited
U.S. PATENT DOCUMENTS

| | | | |
|---|---|---|---|
| 2,917,120 | 12/1959 | Gates et al. | 305/38 X |
| 3,278,244 | 10/1966 | Deffenbaugh et al. | 305/54 |
| 3,285,676 | 11/1966 | Hetteen | 305/54 X |
| 4,448,459 | 5/1984 | Kortering et al. | 305/54 X |
| 4,505,984 | 3/1985 | Stelzer et al. | |
| 4,586,757 | 5/1986 | Bloechlinger | 305/54 X |

FOREIGN PATENT DOCUMENTS

| | | |
|---|---|---|
| 2-49689 | 4/1990 | Japan . |
| 2-96381 | 8/1990 | Japan . |
| 2-96382 | 8/1990 | Japan . |
| 2-96383 | 8/1990 | Japan . |
| 2-96384 | 8/1990 | Japan . |
| 1335172 | 10/1973 | United Kingdom . |

Primary Examiner—Russell D. Stormer
Attorney, Agent, or Firm—Finnegan, Henderson, Farabow, Garrett & Dunner

[57] ABSTRACT

A crawler shoe used in an endless track vehicle having metal shoes made of iron or the like. The metal shoe has two integral projections projecting toward the ground contact side of the shoe. An elastic shoe made of rubber or the like is integrally molded and fixed to the metal shoe around the projections. The elastic shoe is provided with tapered surfaces, stepped portions, or transverse grooves in areas opposite from the projections to reduce shearing stresses exerted on the end portions of the elastic shoe.

9 Claims, 4 Drawing Sheets

SHOE OF CRAWLER BELT OR CHAIN

BACKGROUND OF THE INVENTION

1. Field of the Invention

This invention relates to a shoe for a crawler belt or chain, hereinafter referred to as "crawler shoe" used in an endless track vehicle, such as a construction or agricultural machine or the like.

2. Description of the Related Art

As shown in FIG. 4, in the prior art, such an endless track vehicle has crawler belts or chains, each of which has a plurality of crawler shoes 10 mounted thereon. Each crawler shoe 10 comprises a metal shoe 11 made of iron or the like having a plurality of integral projections 11a, 11b that project towards the ground contact side of the shoe and an elastic shoe 12 made of a rubber or the like, integrally molded and fixed to the metal shoe 11 around the projections on its ground contact side, so as to prevent a paved road from being damaged by the crawler shoe 10. The elastic shoe 12 and the metal shoe 11 of the crawler shoe 10 have bolt inserting screw holes (not shown) that penetrate them for mounting one on the other. The crawler shoes 10 are connected to each other, in turn, by means of links 30 and pins 20 with bolts and nuts to constitute an endless crawler belt or chain.

In such a conventionally known crawler shoe 10, elastic shoe 12 has rounded or convex portions 13 on the surface of the respective ends of the shoe in the traveling direction (i.e., at the corners or intersections between the side surfaces or faces 14 extending in a direction transverse to the traveling direction and the ground contact surface 15). Therefore, when a crawler shoe 10, extended around a driving or idler sprocket 40, comes into a position relative to a road surface 50 at a "final link plunge angle $\theta$", the leading rounded end portion 13 of the elastic shoe 12 in the traveling direction will strike the road first and be compressed between the road surface 50 and a first projection 11a on the metal shoe 11. This subjects the rubber around this portion 13 to an expansion strain or deformation due to the shearing forces encountered.

The "final link plunge angle $\theta$" is the angle of a link 30 when the immediately preceding link 30a is in a position parallel to the road surface 50 and its shoe 12a is in contact with the surface and is represented as follows: $\theta = 360°/n$, where n = number of links that would fit around sprocket 40.

During traveling on a gravel road, if pebbles or the like on the road are encountered by the leading side faces 14 of the elastic shoes 12, the rubber there will be deformed and sometimes a part of the rubber may be broken off.

SUMMARY OF THE INVENTION

An object of the present invention is to provide a crawler shoe in which the elastic shoe, particularly at the respective end portions of the crawler shoe, will not be affected by shearing forces when the crawler shoe comes to a "plunge position" with respect to the road surface.

Still another object of the present invention is to provide a crawler shoe in which the drawbacks as mentioned above with reference to the prior art can be overcome.

According to the present invention, there is provided a crawler shoe for use with a plurality of other crawler shoes pivotally linked together to form a chain of shoes for use with an endless track vehicle, said crawler shoe having a ground contact side facing toward a ground surface and comprising a metal shoe having integrally formed thereon at least two spaced projections projecting toward said ground contact side and located at the leading and trailing ends of the metal shoe with respect to the traveling direction of said crawler shoe and an elastic shoe integrally molded and fixed to said metal shoe over said projections on its ground contact side, said elastic shoe having vertical side surfaces at its leading and trailing ends with respect to and extending transverse to the traveling direction of the crawler shoe and a ground contact surface between said ends in a central portion thereof, and a tapered surface at at least the leading end of said elastic shoe extending from said leading side surface, over the leading projection at the leading end of the metal shoe to an intersection point with said ground contact surface that is nearer to the central portion of the elastic shoe than said leading projection.

In another embodiment, the elastic shoe is provided with a stepped portion at a position opposite from and extending over at least the leading one of the projections, the stepped portion having a flat surface closer to the metal shoe than that of the ground contact surface of the central portion thereof in the traveling direction.

In another embodiment, the elastic shoe is provided with a transverse groove between the trailing side of at least the leading one of the projections and the central portion of the shoe in the traveling direction, the transverse groove having a depth closer to the metal shoe than the top of the projection.

In the crawler shoe according to the present invention, at the final link plunge angle $\theta$, the portion of the elastic shoe which comes into contact with the road surface is subjected to a compression stress more than a shearing strain or deformation. Therefore, during traveling on a gravel road, even if pebbles or the like on the road are encountered by these portions, the rubber there will not be damaged. An endurable elastic shoe can thus be obtained.

DESCRIPTION OF THE PREFERRED EMBODIMENTS

The present invention will now be described in detail with reference to the embodiments of the crawler shoe shown in FIGS. 1, 2 and 3.

Figure 1:
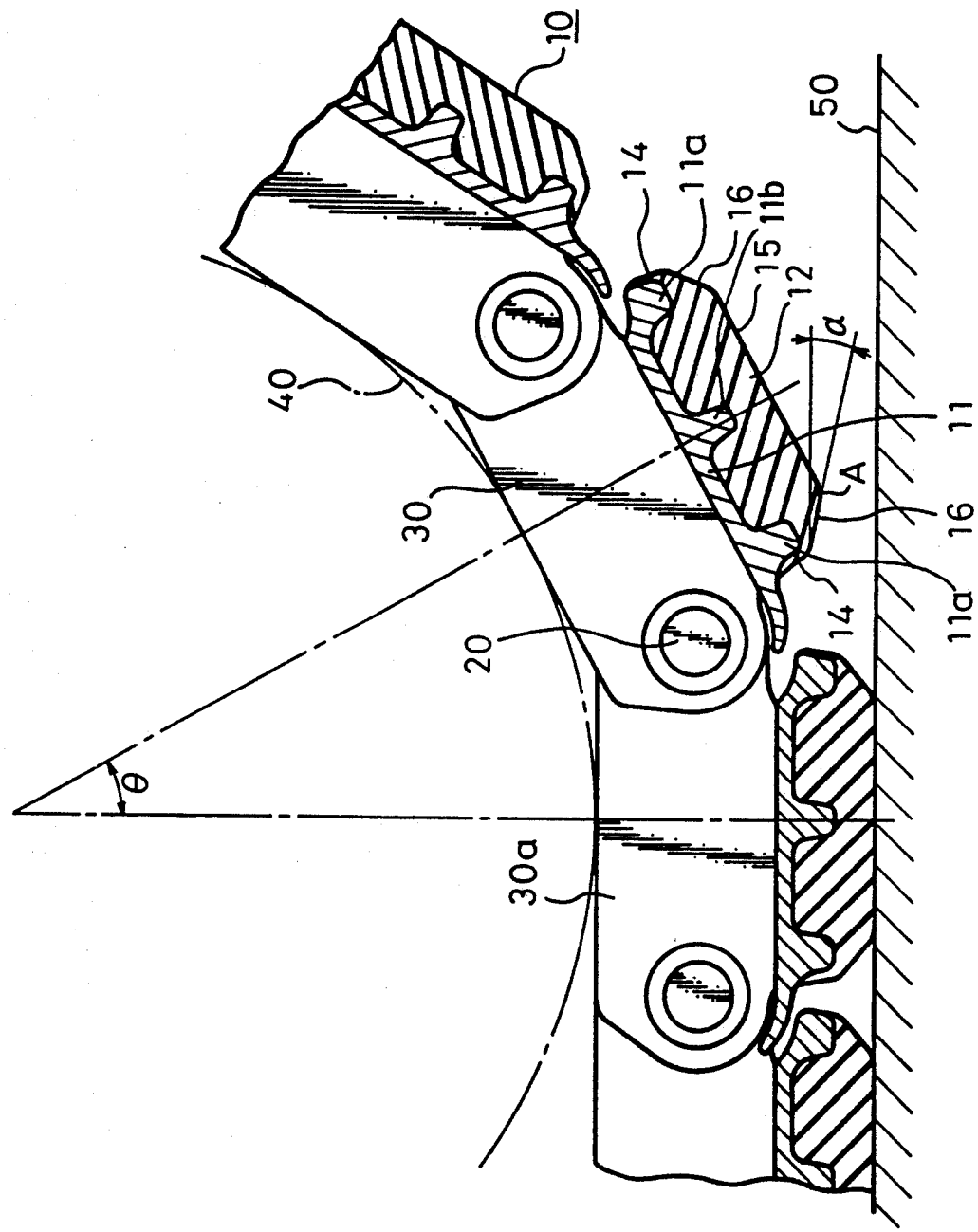
FIG. 1 is a cross-sectional view of a first embodiment of this invention, showing a part of a crawler belt having a plurality of crawler shoes, one shoe being in contact with a road surface and another at a plunge position.
Figure 4:
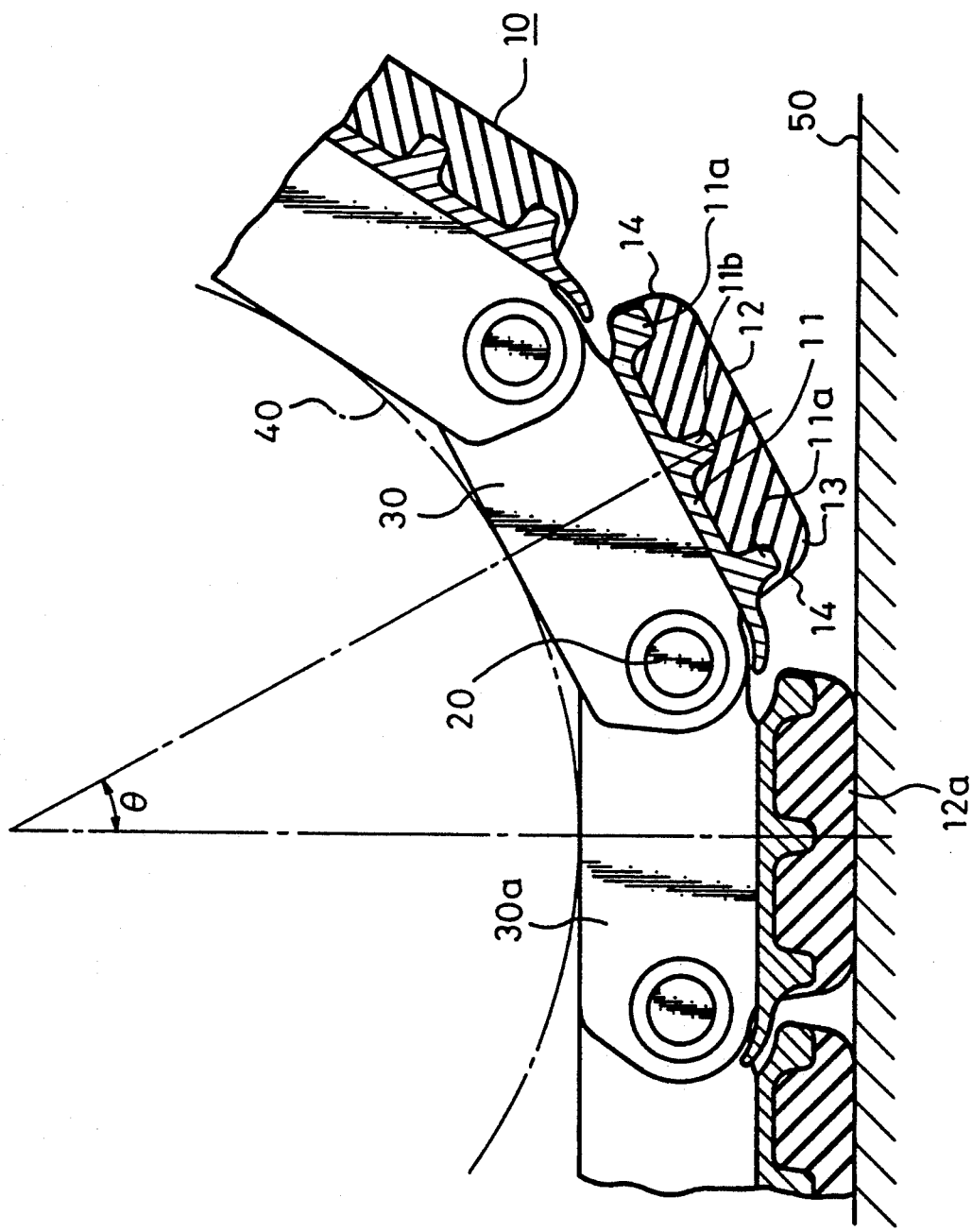
FIG. 4 is a cross-sectional view of a conventionally known crawler belt, illustrating one shoe in contact with the road surface and another at a plunge position.

In FIG. 1, the parts or elements of the crawler shoe corresponding to those shown in FIG. 4 are indicated by the same reference numerals.

In accordance with the invention, the outer surface of the elastic shoe 12 of the crawler shoe 10 is provided with a tapered surface 16 at both ends that extends between its vertical side faces 14 at the ends of the shoe in the traveling direction and its ground contact surface 15, which on contact is horizontal with respect to the traveling direction. In other words, on the outer surfaces of the shoes in the areas that are vertically opposite from and over projections 11a on the metal shoe 11, the tapered surfaces 16 extend from a side face 14 to an intersecting point A with the ground contact surface 15 that is nearer to the central portion of the shoe than the projections.

The slope or angle of inclination of the tapered surface 16 is set with respect to the thickness of elastic shoe 12, such that when a link is at its final link plunge angle $\theta$, it forms an angle $\alpha$ between it and the road surface 50 (i.e., the horizontal surface) that is from 0–30 degrees, preferable 5–15 degrees.

If the slope of the tapered surface 16 inclines downwardly with respect to road surface 50 at this point, the inclination angle $\alpha$ is considered a plus angle, and if it inclines upwardly with respect to the road surface, the inclination angle $\alpha$ is considered a minus angle.

If the inclination angle $\alpha$ is minus (i.e., less than 0 degrees) and if pebbles or the like on the road exist in the space between the tapered surface 16 and the road surface 50, the tapered surface 16 then will be subjected to the weight of the vehicle and, in some cases the elastic shoe might be damaged. On the other hand, if the inclination angle $\alpha$ is more than 30 degrees, when an end portion of the elastic shoe 12 in the traveling direction comes into contact with the road surface 50, the deformation strains exerted on the elastic shoe 12 will increase due to shearing forces.

Although in the above-mentioned first embodiment the ground contact surface 15 of the elastic shoe 12 has a flat surface, as shown in FIG. 1, it may be formed as a convex surface. In addition, the elastic shoe 12 may be provided with transverse grooves (not shown) in the area vertically opposite from a central projection 11b.

The other portions of the crawler shoe shown in FIG. 1 are the same as those shown in FIG. 4, and therefore will not be explained in detail.

According to the embodiment shown in FIG. 1, as the crawler shoe 10 reaches its final link plunge angle $\theta$, elastic shoe 12 will first come into contact with the ground surface 50 at the point A which is the intersection between tapered surface 16 and ground contact surface 15. In other words, the end portions of the elastic shoe 12 in the traveling direction lying over the projections 11a, i.e., the tapered surfaces 16 opposite from a first projection 11a, do not contact the ground surface first. Therefore, these portions are subjected more to a compression stress than a shearing stress and, thus, any deformation due to shearing forces will be considered reduced.

Thus, during traveling on a gravel road, even if pebbles or the like on the road are encountered by the side faces 14 of the elastic shoes 12, the rubber there will not be damaged.

If the slope or inclination angle $\alpha$ of the tapered surface 16 is 0–30 degrees, expansion strains or deformation exerted on the elastic shoe 12 can be reduced to a minimum value. Also, if, as mentioned above, the ground contact surface 15 has a convex surface, stress concentrations on the central portion of the elastic shoe 12 will also be reduced, thereby further reducing the possibilities of damage to the rubber of the shoe.

Figure 2:
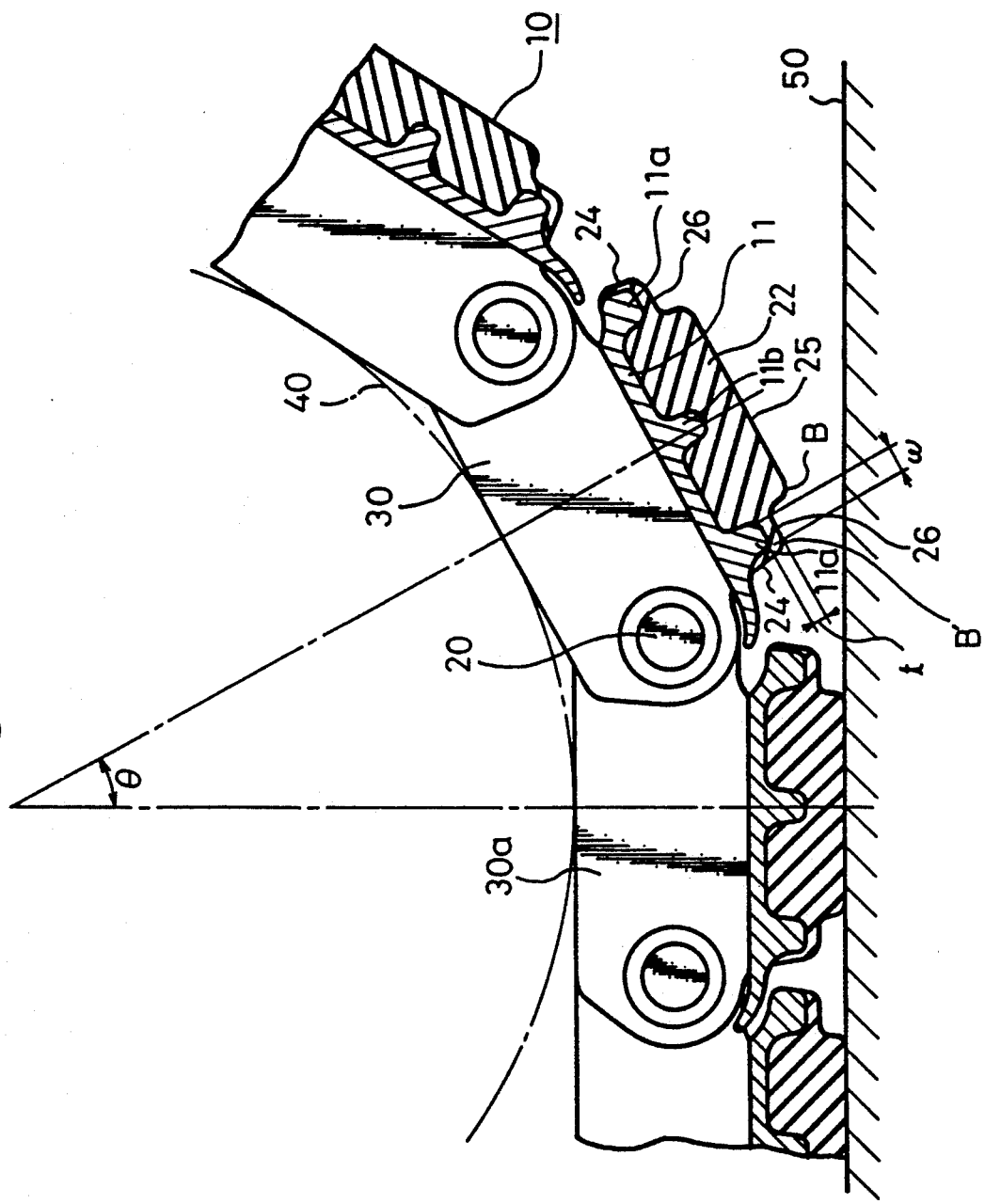
FIG. 2 is a cross-sectional view of a second embodiment of this invention, showing a part thereof similar to FIG. 1.

FIG. 2 shows a second embodiment of this invention. In FIG. 2, the parts or elements of the crawler shoe corresponding to those shown in FIGS. 1 and 4 are indicated by the same reference numerals.

Here the surface of the elastic shoe 22 of the crawler shoe 10 has a stepped portion 26 at both ends at the intersection between the vertical side faces 24 at the ends of the shoe in the traveling direction and the ground contact surface 25 in a central portion thereof that extends horizontally with respect to the traveling direction. In other words, in the areas of the elastic shoe 22 vertically opposite from or adjacent to the projections 11a of the metal shoe 11. The stepped portions 26 have an intermediate flat surface parallel to and closer to the metal shoe 11 than the ground contact surface 25.

Preferably, the rubber thickness t of the stepped portion 26 of the elastic shoe 22 is equal to or less than the width w of a projection 11a at its upper end surface. Thus preferably $t \leq w$.

If the rubber thickness t is more than the width w of the upper end surface of the projection, the shearing rigidity around the stepped portion 26 will be increased and, therefore, during traveling on a gravel road, pebbles or the like on the road will easily be encountered by the side face 24 of the elastic shoes 22 and the rubber there can easily be damaged.

Preferably, elastic shoe 22 has a cross-section such that intersection point B between the ground contact surface 25 and the stepped portion 26 of the elastic shoe 22 is nearer to the ground surface 50 than intersection point B' between the stepped portion 26 and a side face 24 at the time the link reaches the final link plunge angle $\theta$.

Although in the above-mentioned second embodiment the ground contact surface 25 of the elastic shoe 22 has a flat surface, it may be formed as a convex surface. In addition, the elastic shoe 22 may have transverse grooves (not shown) in the areas opposite a central projection 11b, in the same manner as the first embodiment.

The other portions of the crawler shoe shown in FIG. 2 are the same as those shown in FIGS. 1 and 4, and therefore will not be discussed in detail.

According to the embodiment shown in FIG. 2, as crawler shoe 10 reaches final link plunge angle $\theta$, stepped portion 26 of the elastic shoe 22 does not contact the ground surface, but rather point B of the ground contact surface 25, which is farther from the metal shoe than the stepped portion 26, comes into contact with the ground surface. Ground contact surface 25 is formed to extend in the central area of the elastic shoe 22 and away from projection 11a. Therefore, these portions are subjected to a compression stress more than a shearing stress resulting in less damage to the rubber in these areas.

Therefore, only a very small or almost no deformation forces are exerted on the end portions of the elastic shoe 22 including the stepped portions 26 between the side surfaces 24 and the ground contact surface 25. Therefore, during traveling on a gravel road, even if pebbles or the like on the road are encountered by the end portions of the elastic shoe 22, the rubber there will not be damaged.

Particularly, if the rubber thickness t of the stepped portions 26 of the elastic shoe 22 is equal to or less than the width w of projection 11a, expansion strains exerted on the elastic shoe 22 can be reduced to a minimum value.

Also, if the ground contact surface 25 of the elastic shoe 22 has a convex surface, stress concentrations on the central portion of the elastic shoe 22 will also be reduced, thereby further reducing damage to the rubber of the shoe.

Figure 3:
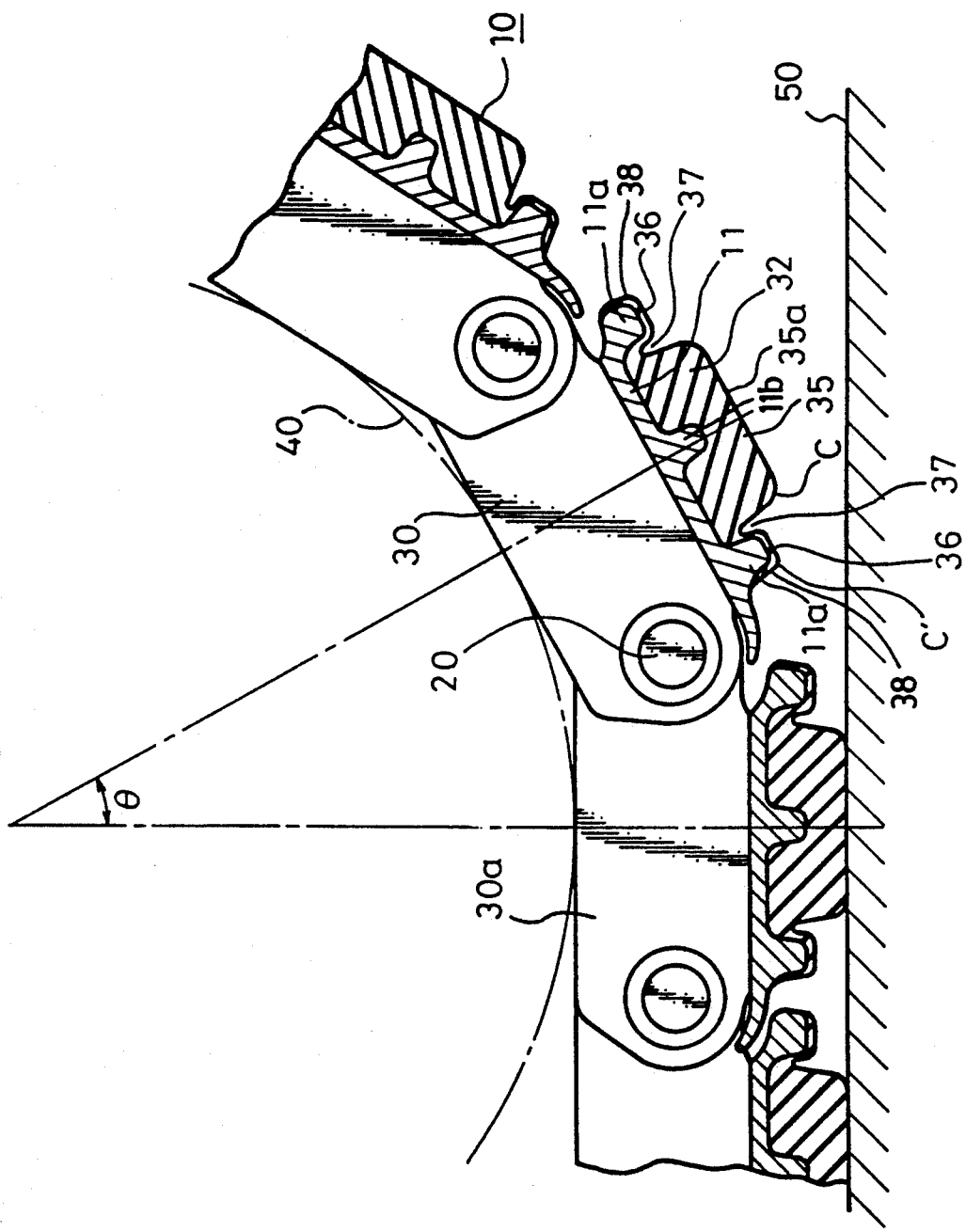
FIG. 3 is a cross-sectional view of a third embodiment of this invention, showing a part thereof similar to FIG. 1.

FIG. 3 shows a third embodiment of this invention. In FIG. 3, the parts or elements of the crawler shoe corresponding to those shown in FIGS. 1, 2 and 4 are indicated by the same reference numerals.

The surface of the elastic shoe 32 of this crawler shoe is provided with transverse grooves 37 at positions remote from the projections 11a at the ends of the metal shoe 11 in the traveling direction and nearer a central portion thereof. The depth of the grooves 37 is smaller than the height of the projections 11a. In other words, the bottom of the grooves 37 is farther from the ground contact surface 35a than the top of the projections 11a.

Thus, the surface of the elastic shoe 32 is divided by such grooves 37 into a central portion 35 between the two grooves 37 and side edge portions 36 extending from the grooves 37 over the projections 11a to side faces 38. Central portion 35 has a flat ground contact surface 35a in the embodiment shown in FIG. 3.

The elastic shoe 32 has a cross-section such that the height of the side edge portions 36 of the elastic shoe 32 is lower than the height of the central portion 35 and intersection point C of the ground contact surface 35a of the central portion 35 is nearer to the road surface 50 than the side edge portions 36, at the time the link reaches the final link plunge angle $\theta$.

In the above-mentioned third embodiment, although the ground contact surface 35a of the elastic shoe 32 has a flat surface, it may be formed as a convex surface. In addition, the elastic shoe 32 may be provided with transverse grooves (not shown) in the areas opposite a central projection 11b, in the same manner as the first and second embodiments.

The other portions of the crawler shoe shown in FIG. 3 are the same as those shown in FIGS. 1, 2 and 4, and therefore will not be discussed in further detail.

According to the embodiment shown in FIG. 3, as a crawler shoe 10 reaches final link plunge angle $\theta$, the side edge portion 36 of the elastic shoe 32 does not come into contact with the ground surface, but rather point C of the central portion 35 spaced therefrom by the transverse groove 37 first comes into contact with the road surface 50. The central portion 35 is formed to extend in the central area of the elastic shoe 22 and away from the projections 11a. Therefore, the edge portions 36 are subjected more to a compression stress than a shearing stress.

Thus, only a very small or almost no deformation force is exerted on the plunging ends of the elastic shoe 32 including the side edge portions 36 and the central portion 35. Therefore, during traveling on a gravel road, even if pebbles or the like on the road are encountered by the side edge portions 36 or the ground contact surface 35a, the rubber there will not be damaged.

In the third embodiment shown in FIG. 3, the rubber thickness at the side edge portions 36 and the central portion 35 of the elastic shoe can be selected in such a manner that point C' of the side edge portions 36 is nearer to the road surface 50 than the point C of the ground contact surface 35a, at the time of the final link plunge angle $\theta$.

In this case, the side edge portion 36 of the elastic shoe 32 will come into contact with the ground surface 50 before the central portion 35. However, even if the rubber around the side edge portion 36 is damaged due to shearing stresses, the rubber in the central portion 35 is protected by the transverse groove 37 and, therefore, prevented from being damaged.

In the embodiment shown in FIG. 3, although the side edge portion 36 is covered by a relatively thin thickness of rubber, the rubber at this portion may be removed so that the upper surface of the projection 11a is exposed.

Also, if the ground contact surface 35a of the elastic shoe 22 has a convex surface, stress concentrations on the central portion of the surface will be reduced and, therefore, damage of the rubber around the central portion 35 will be eliminated.

It should be understood by those skilled in the art that the foregoing description relates to only preferred embodiments of the disclosed invention, and that various changes and modifications may be made to the invention without departing from the spirit and scope thereof.

I claim:

1. A crawler shoe for use with a plurality of other crawler shoes pivotally linked together to form a chain of shoes for use with an endless track vehicle, said crawler shoe having a ground contact side facing toward a ground surface and comprising a metal shoe having integrally formed thereon at least two spaced projections projecting towards said ground contact side and located at the leading and trailing ends of the meal shoe with respect to the traveling direction of said crawler shoe and an elastic shoe integrally molded and fixed to said metal shoe over said projections on its ground contact side, said elastic shoe having vertical side surfaces at its leading and trailing ends with respect to the traveling direction of the crawler shoe that extend transverse to said direction and a ground contact surface between said ends in a central portion thereof, and a tapered surface at at least the leading end of said elastic shoe extending from said leading side surface, over the leading projection at the leading end of the metal shoe to an intersection point with said ground contact surface that is nearer to the central portion of the elastic shoe than said leading projection.

2. The crawler shoe of claim 1, wherein the inclination angle $\alpha$ of said tapered surface on the leading end of said elastic shoe of the crawler shoe forms an angle of from 0 to 30 degrees relative to said ground surface when the ground contact surface of the elastic shoe of the immediately proceeding crawler shoe relative to the traveling direction of said crawler shoes is parallel to said ground surface.

3. The crawler shoe of claim 1, wherein said elastic shoe has two tapered surfaces at either end extending from a respective side surface over a respective projection towards the central portion of said elastic shoe.

4. A crawler shoe for use with a plurality of other crawler shoes pivotally linked together to form a chain for use with an endless track vehicle, said crawler shoe having a ground contact side facing toward a ground surface and comprising a metal shoe having integrally formed thereon at least two spaced projections projecting toward said ground contact side and located at the leading and tailing ends of the metal shoe with respect to the traveling direction of said crawler shoe, said projections having an upper surface and an elastic shoe integrally molded and fixed to said metal shoe over said projections on its ground contact side, said elastic shoe having vertical side surfaces at its leading and trailing ends with respect to the traveling direction of the crawler shoe that extend transverse to said direction and a ground contact surface between said ends in a central portion thereof and at least one stepped portion over said leading projection at the leading end of the metal shoe, said stepped portion extending between an intersection point with said leading side surface to an intersection point with said ground contact surface that is nearer to the central portion of the elastic shoe than said leading projection, said stepped portion having a flat surface parallel with said ground contact surface of said elastic shoe that is closer to the metal shoe than said ground contact surface, the distance of said flat surface from said leading projection being equal to or less than the width of the upper surface of the leading projection relative to traveling direction of the crawler shoe.

5. The crawler shoe of claim 4, wherein the intersection point of the stepped portion with the ground contact surface of a crawler shoe is nearer to the ground surface than the intersection point of the stepped portion with the leading side surface of the elastic shoe when the ground contact surface of the immediately preceding crawler shoe, relative to the traveling direction of said crawler shoe, is parallel to said ground surface.

6. The crawler shoe of claim 4, including two stepped portions at either end of the elastic shoe extending from a respective side surface over a respective projection towards the central portion of said elastic shoe.

7. A crawler shoe for use with a plurality of other crawler shoes pivotally linked together to form a chain for use with an endless track vehicle, said crawler shoe having a ground contact side facing toward a ground surface and comprising a metal shoe having integrally formed thereon at least two spaced projections projecting toward said ground contact side and located at the leading and trailing ends of the metal shoe with respect to the traveling direction of said crawler shoe, said projections having an upper surface and leading and trailing sides and an elastic shoe integrally molded and fixed to said metal shoe over said projections on its ground contact side, said elastic shoe having vertical side surfaces at its leading and trailing ends with respect to the traveling direction of the crawler shoe that extend transverse to said direction and a ground contact surface between said ends in a central potion thereof, and at least one transverse groove in the elastic shoe extending transverse relative to the traveling direction of the crawler shoe located between the trailing side of the leading projection and the central portion of the ground contact surface of the elastic shoe, the bottom of said groove being closer to the metal shoe than the upper surface of said leading projection.

8. The crawler shoe of claim 7, including a stepped portion having a flat surface between said groove and the leading face of the elastic shoe, which flat surface is parallel with said ground contact surface and closer to the metal shoe than said ground contact surface and extending over said leading projection, the intersection point of said stepped portion with the ground contact surface of the elastic shoe being nearer to the ground surface than the intersection point of the stepped portion with the leading side surface of the elastic shoe when the ground contact surface of the immediately preceding crawler shoe, relative to traveling direction of said plurality of crawler shoes, is parallel to said ground surface.

9. The crawler shoe of claim 7, including two transverse grooves at either end of the elastic shoe on the side of a respective projection closer to the central portion of said elastic shoe.

* * * * *